Figure 1:
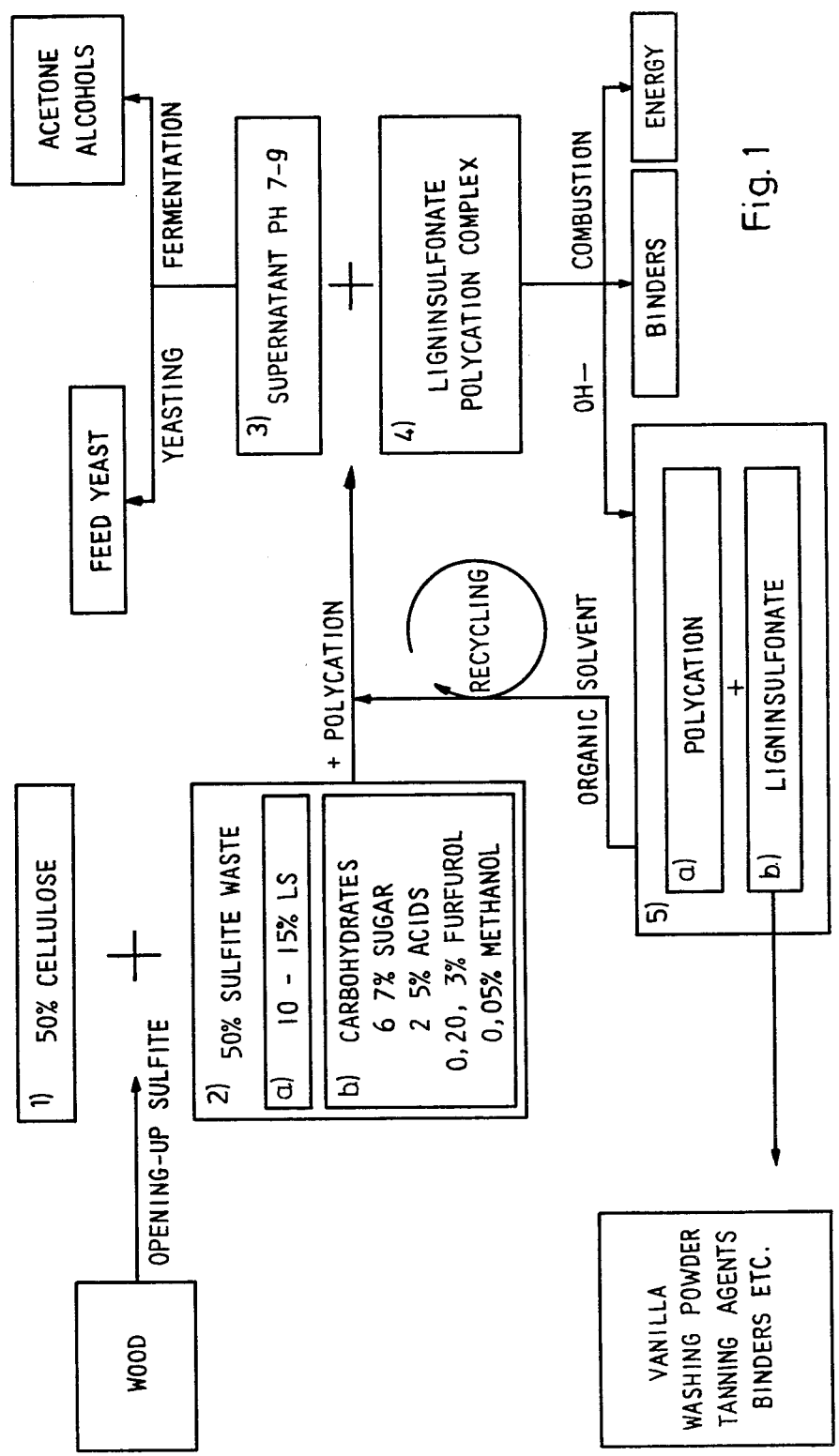

United States Patent [19]

Haars et al.

[11] Patent Number: 4,459,228

[45] Date of Patent: Jul. 10, 1984

[54] METHOD FOR PRECIPITATION OF SULPHONATED LIGNIN FROM SULFIDE WASTES

[75] Inventors: Annegret Haars; Aloys Hüttermann, both of Göttingen, Fed. Rep. of Germany

[73] Assignee: Gelsellschaft für Biotechnologische Forschung, Braunschweig, Fed. Rep. of Germany

[21] Appl. No.: 309,175

[22] Filed: Oct. 7, 1981

[30] Foreign Application Priority Data

Oct. 10, 1980 [DE] Fed. Rep. of Germany ....... 3038241

[51] Int. Cl.$^3$ ............................................... C07G 1/00
[52] U.S. Cl. ............................................... 260/124 R
[58] Field of Search ......................................... 260/124

[56] References Cited

U.S. PATENT DOCUMENTS

| | | | |
|---|---|---|---|
| 2,839,417 | 6/1958 | Tousignant et al. | 260/124 |
| 2,842,534 | 7/1958 | Doughty | 260/124 |
| 3,697,497 | 10/1972 | Falkehag | 260/124 |
| 4,336,189 | 6/1982 | Hämälä et al. | 260/124 |

OTHER PUBLICATIONS

Chem. Abstr., vol. 92,(1980) 24548k.
Chem. Abstr., vol. 92,(1980) 8022d.
Chem. Abstr., vol. 95,(1981) 120505b.

Primary Examiner—Delbert R. Phillips
Attorney, Agent, or Firm—Max Fogiel

[57] ABSTRACT

The invention relates to a method for precipitating lignin sulphonates from sulfide wastes, in that a precipitation complex develops by the addition of polycations.

11 Claims, 2 Drawing Figures

METHOD FOR PRECIPITATION OF SULPHONATED LIGNIN FROM SULFIDE WASTES

It is known from Chemical Abstracts 1976, vol. 85, p. 287, No. 181960, to precipitate lignin sulphonate from sulfide wastes by the addition of quaternery ammonium salts, e.g. poly N-N-dimethylxylylen ammonium chloride. This results in water-insoluble precipitant for which no use is given. Neither a recovery of the precipitant nor an isolation of the pure lignin sulphonate are described. The use of this method forbids itself for expense reasons because of the expensive precipitant.

In the lignin factories working according to the sulfide method, approximately only half the used wood is available as lignin, whereas the remainder occurs as aqueous boiling acid (erroneously called sulfide waste). In the Federal Republic of Germany, approximately 400,000 tons of lignin are dissolved annually during wood separation. On an average one counts about $10^2$ m sulfide waste (concentrated base and wash liquids) per 1 ton of atro lignin. The largest part of these wastes runs off unused into the pre-receiver i.e. into public brooks or rivers and causes a substantial pollution. The lignin sulphonate of the boiler waste contains almost the entire CSB volume of 410 kg $O_2$/t atro lignin. The $BSB_5$, which heretofore had formed the basis of official requirements in water pollution law is thus lower at 76 kg $O_2$/t, but despite this an expensive combined physical, chemical and biological waste water treatment is required in order to reduce the pollution to the maximum $BSB_5$ of 30-50 mg $O_2$/l per 24-hour average which is required in legal guidelines for industrial waste waters. With adoption of the fourth amendment to water household law, however, a further complication arises for sulfide lignin factories in waste water situations in that in the future it will no longer be BSB but CSB which are used as the basis for calculations.

For this reason, beginning with 1966, 257,631 tons out of 294,585 atro sulfide waste was burned ($\hat{=}$87%, annual report of the lignin and paper industry). According to the current state of the art it is possible to acquire approximately 98% of the total load of a sulfide lignin insulation and to supply it to an evaporator. In this process, the organic substance is concentrated in corrosion-resistant evaporators from a 10-15% solution to a 50-60% solution. However, volatile substances are also condensed. The vapor condensates are accordingly impure and cause a renewed pollution of this partial waste water stream. Under good operating conditions this renewed pollution amounts to about 8-18% of the organic boiler load. Aside from the fact that evaporation condensates thus constitute a follow-up problem of the cleaned base liquor, the energy household of the combustion process is not advantageous: 20-50% of the energy which is recovered on burning of the solid sulfide waste is used up again during the evaporation process.

In the Ca-sulfide method which is mainly used in the Federal Republic of Germany, combustion of the waste does not lead to a leach regeneration; the entire sulfur occurs as ash, i.e. $CaSo_4$ (gypsum). In the modern Mg sulfide method the leach regeneration at least operates so that 80% of the Mg and 70% of the sulfur can be recovered. All other methods for elimination and use of sulfide wastes, such as (a) fermentation of the sugars (hexoses) in the waste liquor to ethyl alcohol, (b) fermentation of the pentoses and hexoses to protein-containing yeasts for foods and feeds, (c) fermentation of butanol and acetone by butylogenous bacteria, (d) production of fucfurol of hydrolysis of the pentosones at higher temperatures, (e) oxydizing of the liquid sulphonates of the wastes in alkaline solution to produce vanilla, (f) cleaning (see below) of the concentrated sulfide waste and use of lignin sulphonate as additives for wash powders, tanning substances and in the particle-board industry, (g) precipitation of the sulfide waste with burnt calcium in the 3-stage method, having at the end a pH of 12 (Marathon-Method, C. G. Howard).

are either uneconomical (a-g), not yet tried on a large technical scale (c and g) or are suitable only for a tiny percentage of the overall sulfide waste.

For the recovery of pure lignin sulphonate, as required for example in method f, there existed heretofore only expensive, complicated possibilities, which partly cannot be used on a large technical scale, such as e.g.

(a) ultrafiltration (b) dialysis (c) electrophoresis (d) ion exclusion (e) precipitation of the lignin sulphonate in alcohol (f) precipitation of high-molecular lignin sulphonate with amines such as 4, 4'—to (p-dimethyl-aminodiphenyl) methane (g) extraction of lignin sulphonate acids with long-chained aliphatic amines in amylalcohol (h) precipitation with different long-chain, substituted quaternary ammonium salts (i) adsorption of lignin sulphonates on crab chitin (U.S. Pat. No. 3,297,676).

The purpose of the invention is to so further develop a method according to the type described in the introduction, that the precipitant can be regenerated and is thus available for re-use. With this, the invention also aims to obtain the lignin sulphonate as a pure concentrated product.

According to the invention this is achieved in that polyimines with a low polarity are used as polycations, as polyethyleneimine, so that the precipitation complex is alkali-soluble and the polyimine can be recovered by extraction with organic solvents. The invention proceeds from the concept that the lignin sulphonate of the sulfide waste is precipitated with a very specific polycation, namely a polyimine specifically and quantitatively. The thus obtained salt-like precipitation complex becomes within a short time deposited as a compact deposit, which can be freed of the supernatant by decanting and of the residual water by pressing or centrifuging. The inventive method has a multitude of advantages. Thus the sulfide waste can be used as it is discharged from the boiler without further treatment e.g. thickening. The precipitation is furthermore specific for lignin sulphonate so that after the recovery of the polyimine for re-use, the lignin sulphonate is obtained as a pure product. In most sulfide wastes the precipitation of the lignin sulphonate is quantitative, so that the COD content of the supernatant by comparison to the starting solution is strongly reduced. The precipitant need not, as is otherwise necessary, be used in excess so that the supernatant solution has a pH value of about 8 which is suitable for the further biological degradation. Moreover, the method is suitable for many sulfide wastes, since the precipitation is independent of the type of wood used (beech or pine) and of the opening-up method (e.g. C—a or M—g bisulfide method). The method is inexpensive because the polyimine can be quantitatively received. The lignin sulphonate is finally obtained in such concentrated form that it can be used directly without further concentration in the combustion process or other purposes. The entire precipitation method is carried out without any supply of energy.

For example, polypropyleneimines and/or higher homologous polyimines can be used. What is important is that such polyimines are used which have a low polarity. The polarity must be lower than that of the polyethyleneimine. Since the polyimine is not used in excess the advantage is obtained that it is also not present in the supernatant. Thus the supernatant can be sensibly further processed.

The precipitation can be dissolved in alkaline, aqueous solution, such as natrium solution, colium hydroxide. The alkaline solution is then extracted with an organic solvent, according to the liquid-liquid principle. Thereby the polyimine enters into the organic phase, the lignin sulphonate into the aqueous phase.

There are several possibilities for the polyimine recovery. For example, it is possible to recover the polyimine—which is dissolved in the organic solvent—by evaporating the solvent. However, it is also possible to recover the polyimine dissolved in the organic solvent, by extraction in accordance with the liquid-liquid extraction principle, with an acid aqueous solution. The polyimine can then be directly employed for precipitation in aqueous solution.

The supernatant above the precipitation complex is used for yeasting, fermentation or the production of single-cell proteins.

As evident, the precipitation complex can be used for many applications, as seen in FIG. 1:

(a) The precipitation complex is dissolved in alkali and the polycation recovered by extraction with organic solvents. The alkali-lignin sulphonate thus obtained in pure form can be used for the already described purposes or serve for the enzymatic bonding of chip plates.

(b) The precipitation complex is not dissolved, but used in toto, whereby the possibility of its use in the making of chip plates exists.

(c) Also, the precipitation complex can be burned if the quantity of lignin sulphonate obtained exceeds the sum of the economic use possibilities.

The following examples of the precipitation of lignin sulphonate from different sulfide wastes were for an understanding of the invention and the advantages obtained therewith:

1. Precipitation of different lignin sulphonates with polypropyleneimine (PPI)

5% aqueous solutions of different technical lignin sulphonates (=polyanions) which were set with HCl to pH 3.0, were precipitation at room temperature under shaking with a 3.6% aqueous solution of polypropyleneimine (=polycation). The precipitates (=symplexes) were centrifuged after deposition for 60 minutes at 200 xg, whereafter their water content was 60% (determined by drying over $CaCl_2$ up to weight constancy). After decanting of the supernatants the pH of the same was determined and additionally—after thinning 1:1000 with bidistilled water—the optical density was measured at 280 nm. Lignin sulphonates have a characteristic absorption maximum at 280 nm, which is why this wavelength is generally used to determine the lignin sulphonate content in solutions.

The results of the measurements are shown in FIG. which indicates the precipitation of NA—LS and CA—LS (5%) with polypropyleneimine (3.6%). The upper curve always shows the measured pH values. The lower, descending curve indicates % substance (measured at 280 nm) which is still present in the supernatant (Ü) after precipitation.

The broken lines facilitate the reading of the pH in the supernatant after maximum precipitation (=lowest point of the curve). From this it follows that 8 parts by weight of natrium lignin sulphonate are precipitated by 1 part by weight of polypropyleneimine (PPI) at a pH of 8.3 in the supernatant. 85% of the substance absorbing at 280 nm (lignin sulphonate) were precipitated. A similarly advantageous precipitation ratio was obtained for the precipitation of calcium lignin sulphonate: at a supernatent pH of 8.9, 81% of the lignin sulphonate was precipitated. The weight ratio PPI:Ca—LS also was 1.8.

Figure 2:
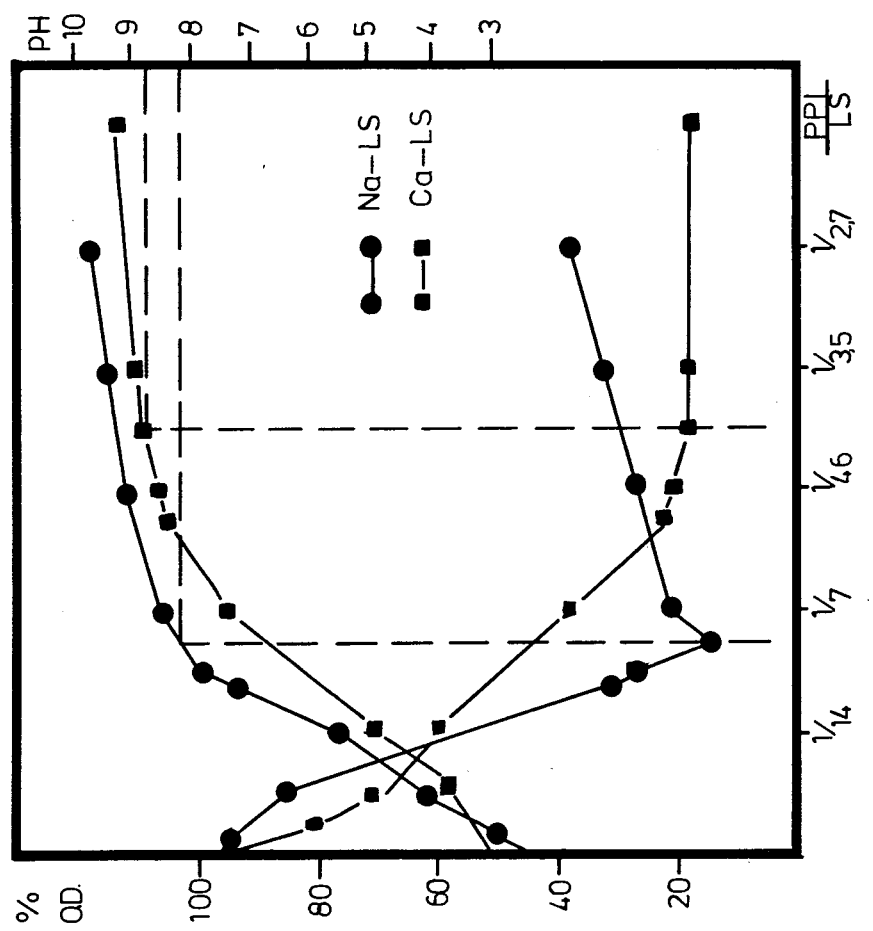

As also evident from FIG. 2, the polycation should not be used in excess, because otherwise the precipitate becomes partially dissolved again (the ratio in the supernatant rises again).

The precipitation of lignin sulphonate acid (LS, 5%) with polypropyleneimine (PPI, 3.6%) at different temperatures follows from the following table. The values indicate how many % of the substance absorbing at 280 nm are precipitated at certain PPI/LS weight ratios.

| T | PPI: LS = 1:x | | | |
|---|---|---|---|---|
| °C. | x = 28 | x = 14 | x = 9 | x = 7 |
| 25 | 27 | 37 | 89 | 85 |
| 37 | 27 | 58 | 83 | 79 |
| 60 | 38 | 66 | 84 | 85 |
| 80 | 55 | 78 | 89 | 86 |

The table shows that a temperature increase up to 80° C. does not disadvantageously influence the precipitation: the higher the temperature during precipitation, the less PPI is needed for symplex formation.

2. Recovery of the precipitant from the precipitate (PPI—LS—Symplex).

1 part PPI—LS—Symplex was dissolved at room temperature under shaking in part. In NaOH the solubility of the precipitant in NaOH, related to atro symplex, is as follows: atro symplex: In NaOH=1:2.5). From this solution PPI was recovered by triple shaking with the same volume dichlorbenzole or dichlormethane, subsequent evaporation for drying and readmission in 1 part water so that with this solution lignin sulphonate could again be precipitated.

SUMMARY

In a method of precipitating lignin sulphonates from sulfide wastes a precipitation complex is created by the addition of polycations. So that the precipitant can be regenerated and is available for re-use, polyimines are used as polycations having a lower polarity than polyethyleneimine, so that the precipitation complex is alkali soluble and the polyimine can be recovered by extraction with organic solvents. In this manner the lignin sulphonate is obtained as a pure concentrated product.

I claim:

1. Method for precipitation of lignin sulphonates from sulphide wastes, comprising the steps of: establishing a precipitation complex by addition of polycations; using an aqueous solution of polyimines as polycations which have a low polarity so that precipitation is alkali soluble; and recovering the polyimine by extraction with organic solvents, polyimine being not used in excess, said aqueous solution of polyimines forming a water-insoluble salt-like precipitate at substantially room temperature and pH of substantially 3.0.

2. method according to claim 1, wherein polypropyleneimine and other homologous polyimines are used.

3. Method according to claim 2, wherein the polyimines have lower polarity than polyethyleneimines.

4. Method according to claim 1, wherein the precipitation is dissolved in alkaline, aquaeous, solutions selected from the group of natrium solution, calcium hydroxide, calium hydroxide.

5. Method according to claim 1, wherein alkaline solution is extracted with organic solvent according to a liquid-extraction process during which the polyimine enters into the organic phase and the lignin sulphonate into the aqueous phase.

6. Method according to claim 5, wherein the organic solvents are selected from the group of chloroform, dichlormethane, dichlorbenzole.

7. Method according to claim 1, wherein the polyimine dissolved in organic solvent is recovered by evaporation of solvent.

8. Method according to claim 1, wherein the polyimine dissolved in the solvent is recovered by extraction with an acid aqueous solution according to a liquid-liquid extraction process.

9. Method according to claim 1, wherein the polyimine is used for precipitation in aqueous solution.

10. Method according to claim 1, wherein the excess above precipitation complex is used for yeasting, fermenting or the production of individual proteins.

11. Method according to claim 1, wherein homologous polyimines are used.

* * * * *